United States Patent [19]

Hutchinson et al.

[11] 4,062,826

[45] Dec. 13, 1977

[54] POLYMERIC SHAPED ARTICLES

[75] Inventors: Francis Gowland Hutchinson; Richard George Cleveland Henbest; Margaret Kenley Leggett, all of Runcorn, England

[73] Assignee: Imperial Chemical Industries Limited, London, England

[21] Appl. No.: 647,890

[22] Filed: Jan. 9, 1976

Related U.S. Application Data

[63] Continuation-in-part of Ser. No. 230,092, Feb. 28, 1972, abandoned, which is a continuation-in-part of Ser. No. 45,946, June 12, 1970, abandoned.

[30] Foreign Application Priority Data

Feb. 20, 1970 United Kingdom .................. 8224/70
June 23, 1969 United Kingdom .................. 31605/69

[51] Int. Cl.$^2$ ............................................. C08L 75/06
[52] U.S. Cl. .................................. 260/40 TN; 260/859 R
[58] Field of Search ....... 260/859 R, 859 PV, 40 TN, 260/37 N

[56] References Cited

U.S. PATENT DOCUMENTS

| 3,047,530 | 7/1962 | Nischk ........................... 260/859 R |
| 3,290,208 | 12/1966 | Lewis ............................. 260/37 N |
| 3,464,935 | 9/1969 | Sepkoski ......................... 260/37 N |
| 3,700,752 | 10/1972 | Hutchinson ...................... 260/859 R |
| 3,886,229 | 5/1975 | Hutchinson ...................... 260/859 R |

Primary Examiner—Paul R. Michl
Attorney, Agent, or Firm—Cushman, Darby & Cushman

[57] ABSTRACT

A shaped polymeric article of a gel-polymerisate of a homogeneous mixture comprising a. from 5% to 95% by weight of polyurethane precursors comprising at least one polyfunctional compound and at least one polyisocyanate of the structure

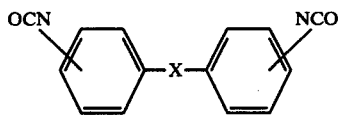

I where X is a divalent radical, preferably —CH$_2$—, said precursors being capable of forming a cross-linked polyurethane having a glass-rubber transition temperature of at least 25° C, preferably at least 35° C, and b. from 95% to 5% by weight of cured polyester resin precursors, comprising
  i. at least one ethylenically unsaturated polyester, and
  ii. at least one vinyl monomer.

34 Claims, No Drawings

POLYMERIC SHAPED ARTICLES

This application is a continuation of application Ser. No. 230,092, filed Feb. 28, 1972, and now abandoned, which application Ser. No. 230,092 is a continuation-in-part of our application Ser. No. 45,946, filed June 12, 1970, also now abandoned.

This invention relates to shaped polymeric articles and in particular to shaped polymeric articles formed from a mixture of the precursors of a cross-linked polyurethane and the precursors of a cured polyester resin, and to a process for their production.

Cured polyester resins formed by polymerisation of an ethylenically unsaturated polyester and a vinyl monomer are known to suffer from certain disadvantages, for example, the impact strengths of such resins are generally very low. We have found that the impact strengths of such resins may be improved by incorporation of the precursors of a cross-linked polyurethane comprising a polyisocyanate and a polyfunctional compound reactive therewith, into the mixture of ethylenically unsaturated polyester and vinyl monomer from which the cured polyester resin is derived and gel-polymerising the resultant mixture. However, although this procedure results in the production of polymeric products having improved impact strength we find that where the aforementioned precursors are capable of forming an elastomeric polyurethane, that is, are capable of forming a cross-linked polyurethane having a low glass-rubber transition temperature some properties, for example, the thermal properties, e.g. the heat distortion temperature, and in particular the mechanical properties, e.g. the flexural moduli and flexural yield strengths of the resultant products, may be much less than the corresponding properties of the cured polyester resin alone.

We have now found that, by selecting precursors of a cross-linked polyurethane which if cured alone would give a product having a glass-rubber transition temperature above a defined minimum temperature, the resultant products formed by gel-polymerising the said precursors with a mixture of ethylenically unsaturated polyester and vinyl monomer not only show improved impact strength when compared with the corresponding property of the cured polyester resin alone but also have a relatively high heat distortion temperature, and in particular have very much improved mechanical properties, e.g. flexural moduli and flexural yield strengths, than products in which the aforementioned precursors are capable of forming an elastomeric polyurethane. Moreover, we have found that by careful choice of the polyisocyanate component of the polyurethane, precursors polymeric products may be prepared which have a higher heat distortion temperature and/or a higher impact strength than may be prepared by using many other types of polyisocyanate. The products of our invention have a useful combination of properties and in particular have high clarity and good mechanical properties.

According to the present invention we provide a shaped polymeric article of a gel-polymerisate of a homogeneous mixture comprising a. from 5% to 95% by weight of polyurethane precursors comprising at least one polyfunctional compound containing groups reactive with isocyanate groups and at least one polyisocyanate, said precursors being capable of forming a cross-linked polyurethane having a glass-rubber transition temperature of at least 25° C, and in which the polyisocyanate comprises at least one compound of the structure:

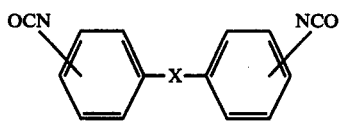

where X is a divalent radical, or a mixture comprising a substantial proportion of at least one polyisocyanate having the structure I with at least one other polyisocyanate, and b. from 95% to 5% by weight of cured polyester resin precursors comprising
 i. at least one ethylenically unsaturated polyester containing in each molecule at least two groups reactive with isocyanate groups, and
 ii. at least one vinyl monomer.

By homogeneous mixture we mean a mixture in which there is no phase separation visible to the unaided eye.

By glass-rubber transition temperature we mean the temperature of the glass-rubber transition as measured using a Du Pont 900 Thermal Analyser the rate of heating of the sample being 20° C per minute.

By vinyl monomer we mean a monomer containing at least one ethylenically unsaturated group which will react with the ethylenically unsaturated groups in the polyester, and within the scope of this definition we include monomers containing one or more allyl groups.

For a combination of good thermal and impact properties it is preferred that the divalent radical X in the polyisocyanate having the structure I contains not more than three atoms in the chain between the phenyl groups, that is, excluding atoms or groups pendant from the chain.

Suitable polyisocyanates having the structure I above which may be used include, for example, those in which the divalent radical —X— is —O— or —SO$_2$—, especially the 4:4'-diphenyl derivatives. The radical —X— may, for example, have the structure —(CH$_2$)$_n$— where $n$ is a whole number in the range 1 to 3.

If desired, one or more of the hydrogen atoms in the radical —(CH$_2$)$_n$— may be replaced by hydrocarbyl groups. Preferred hydrocarbyl groups include, for example, alkyl groups, e.g. alkyl groups having from 1 to 5 carbon atoms.

On account of availability and cost and the properties of the product derived therefrom a preferred polyisocyanate is 4:4'-diphenylmethane diisocyanate. If desired a mixture of two or more polyisocyanates of the structure I may be used.

If desired one or more polyisocyanates having the structure I above, and in particular 4:4'-diphenylmethane diisocyanate, may be used in an unpurified form in admixture with other polyisocyanates, the polyisocyanates of structure I being present in a substantial proportion, say, in a concentration of at least 40% by weight of the total polyisocyanate, and preferably greater. A suitable mixture of such polyisocyanates which may be mentioned is a mixture of 4:4'-diphenylmethane diisocyanate and other polyisocyanates having a total isocyanate functionality of approximately 2.7 and sold commercially as Suprasec DN by Imperical Chemical Industries Limited.

Polyfunctional compounds suitable for use as polyurethane precursors contain groups which are reactive with isocyanate groups, for example, hydroxyl or carboxyl groups. Mixtures of two or more polyfunctional compounds may be used. Polyfunctional compounds containing hydroxyl groups are preferred as reaction of carboxyl groups with isocyanate groups produces carbon dioxide which may lead to the undesirable formation of voids in the product.

Polyurethane precursors must be chosen which would, if cured alone in the absence of the cured polyester resin precursors, yield a cross-linked polyurethane having a glass-rubber transition temperature of at least 25° C.

Thus, where the polyisocyanate component of the polyurethane precursors comprises one or more diisocyanates having the structure I in the absence of any other polyisocyanates of higher functionality, the polyfunctional compound component of the polyurethane precursors must, if the precursors are to be capable of forming a cross-linked polyurethane, comprise at least one compound reactive with the polyisocyanate and which is trifunctional or of higher functionality. If desired the polyfunctional compound or compounds which are trifunctional or of higher functionality may be used in admixture with suitable difunctional compounds reactive with isocyanate groups.

Where the polyisocyanate component of the polyurethane precursors comprises a substantial proportion of at least one diisocyanate having the structure I in admixture with one or more other polyisocyanates and at least one of the other polyisocyanates is trifunctional or of higher functionality, one or more polyfunctional compounds which are only difunctional may suitably be used as cross-linkable polyurethane precursors. However, even in this case it is preferred to use as the polyfunctional compound component at least one compound which is trifunctional or of even higher functionality.

As will be apparent from the following Examples, suitable polyfunctional compounds include, for example, saturated polyols, e.g. polyether polyols, and saturated polyesters, especially substantially hydroxy-terminated polyesters. The polyester and polyol polyfunctional compounds are free from ethylenic unsaturation.

Examples of suitable saturated polyols include glycols of the structure HO—R—OH where R is, for example, an alkylene chain, e.g. ethylene glycol, propylene glycol, butane-1:4-diol, pentane-1:5-diol, hexane-1:6-diol, di(ethylene glycol) and di(propylene glycol). Other suitable polyols include polymers, preferably low molecular weight polymers, derived from glycols, for example, poly(ethylene glycol), poly(propylene glycol) and poly(butylene glycol). Suitable polyols which are trifunctional or of even higher functionality include, for example, glycerol, pentaerythritol, neopentyl glycol, trialkylol alkanes, e.g. trimethylol propane, triethylol propane, tributylol propane and oxyalkylated derivatives, especially those of low molecular weight, of said trialkylol alkanes, e.g. oxyethylated trimethylol propane and oxypropylated trimethylol propane. Oxyalkylated glycerols are also suitable, e.g. oxypropylated derivatives of glycerol, especially those derivatives of low molecular weight.

Examples of suitable saturated polyesters include condensates of at least one diol of the structure HO—R—OH with at least one dicarboxylic acid of the structure HOOC—R—COOH, where R is, for example, an alkylene chain which may be the same or different in the diol and in the diacid. suitable examples include poly(ethylene adipate), poly(ethylene sebacate), poly(ethylene glutarate), poly(ethylene pimelate), poly(propylene adipate), poly(propylene sebacate), poly(propylene glutarate) and poly(propylene pimelate).

As will be apparent from the following Examples, the polyester polyfunctional compounds suitable for use as a component of the polyurethane precursors according to the invention are saturated polyesters, for example, condensates of polyols and a carboxylic acid monomer, either of which has a functionality greater than two.

Suitable saturated polyesters of functionality greater than two may be prepared by condensation of one or more saturated polyols of functionality greater than two, possible in admixture with one or more diols, with one or more saturated dicarboxylic acids. If desired one or more of the dicarboxylic acids may be replaced by one or more carboxylic acids of functionality greater than two. Alternatively one or more saturated polycarboxylic acids of functionality greater than two, possibly in admixture with one or more dicarboxylic acids may be condensed with one or more diols. Polyesters of functionality greater than two which may be mentioned in particular include a condensate of adipic acid with glycerol and either ethylene glycol or propylene glycol, and a condensate of adipic acid with trimethylol propane and either di(ethylene glycol) or propylene glycol.

As hereinbefore discussed polyurethane precursors must be chosen which, if cured alone in the absence of the cured polyester resin precursors, would give a cross-linked polyurethane having a glass-rubber transition temperature of at least 25° C. From the foregoing discussion the man skilled in the art of polyurethane chemistry and technology will readily recognise how to choose polyurethane precursors which fulfill the above-mentioned criterion.

The glass-rubber transition temperature depends on the chemical nature of the polyurethane precursors and on the degree of cross-linking of the cross-linked polyurethane. For example, where the polyurethane precursors comprise a specified diol and triol and a diisocyanate having the structure I above, the glass-rubber transition temperature of the cross-linked polyurethane which could be produced from these precursors will depend on the proportion of the diol to the triol used, and in general, the greater the proportion of triol the greater would be the glass-rubber transition temperature. Where the polyurethane precursors comprise, for example, a diisocyanate having the structure I above and an oxyalkylated triol, the glass-rubber transition temperature of the cross-linked polyurethane which could be produced from the precursors will depend on the molecular weight of the oxyalkylated triol, in general the lower the molecular weight of the triol the greater would be the glass-rubber transition temperature. The man skilled in the art will readily be able to select suitable combinations of polyurethane precursors particularly with the aid of the Examples set out at the end of this specification.

The ethylenically unsaturated polyester component of the cured polyester resin precursors may be derived, for example, by esterification of an unsaturated dicarboxylic acid or mixture of such acids with a saturated diol or mixture of such diols, or by esterification of a saturated dicarboxylic acid or mixture of such acids with an unsaturated diol or mixture of such diols. If desired one or more unsaturated acid or acids may be used together with or in place of the saturated acid or acids, and one or more unsaturated diol or diols may be used together with or in place of the saturated diol or diols. Where possible, an anhydride may be used in place of the corresponding dicarboxylic acid. One or more carboxylic acids or functionality greater than two may be used together with of in place of one or more of the dicarboxylic acids. Similarly, one or more polyols of functionality greater than two may be used together with or in place of one or more of the diols.

Examples of suitable ethylenically unsaturated polyesters include, for example, those formed by esterification of maleic acid or anhydride, fumaric acid, or itaconic acid or mixtures thereof with, for example, ethylene glycol, propylene glycol, butane-1:4-diol, pentane-1:5-diol, cyclohexane-1:4-diol glycerol, trimethylol propane or neopentyl glycol or mixtures thereof. Suitable saturated acids which may also be incorporated into the above described ethylenically unsaturated polyesters include, for example phthalic acid or anhydride, isophthalic acid, terephthalic acid, adipic acid, sebacic acid, glutaric acid or pimelic acid or mixtures thereof. Examples of suitable ethylenically unsaturated polyesters which may be mentioned in particular include a condensate of isophthalic acid and fumaric acid with propylene glycol, a condensate of phthalic acid or anhydride and fumaric acid with propylene glycol, cyclohexane-1:4-diol or neopentyl glycol, and a condensate of propylene glycol with either fumaric acid or a mixture of phthalic acid or anhydride and maleic acid or anhydride.

Examples of suitable vinyl monomers include, for example, vinyl esters, aromatic vinyl compounds and vinyl nitriles. Suitable vinyl esters include, for example, vinyl acetate and esters of acrylic acid having the formula $CH_2=CH-COOR$, where R is an alkyl, aryl, alkaryl, aralkyl or cycloalkyl group. For example, R may be an alkyl group having from 1 to 20, and preferably 1 to 10 carbon atoms. Particular vinyl esters which may be mentioned include for example, methyl acrylate, ethyl acrylate, n- and iso-propyl acrylates, and n-, iso- and tertiary-butyl acrylates.

Other suitable vinyl esters include, for example, esters of formula $CH_2=C(R')COOR$, where R' may be an alkyl, aryl, alkaryl, aralkyl or cycloalkyl group. In the ester of formula $CH_2=C(R')COOR$, R and R' may be the same or different. Particular vinyl esters which may be mentioned include, for example, methyl methacrylate, ethyl methacrylate, n- and iso-propyl methacrylate, and n-, iso- and tertiary-butyl methacrylate.

Aromatic vinyl compounds which may be mentioned include, for example, styrene and derivatives thereof, e.g. α-alkyl derivatives of styrene, e.g. α-methyl styrene, and vinyl toluene.

Suitable vinyl nitriles include, for example, acrylonitrile and derivatives thereof, e.g. methacrylonitrile.

Polyfunctional vinyl monomers, that is, monomers containing two or more vinyl groups are also suitable. Suitable monomers include, for example, glycol dimethacrylate, divinyl benzene and diallyl phthalate.

The proportion of vinyl monomer or monomers to ethylenically unsaturated polyester in the cured polyester resin precursors is preferably in the range 40 to 90% by weight of at least one ethylenically unsaturated polyester to 60 to 10% by weight of at least one vinyl monomer. More preferably, the said precursors comprise from 50 to 70% by weight of at least one ethylenically unsaturated polyester and from 50 to 30% by weight of at least one vinyl monomer.

The proportion of the precursors of the crosslinked polyurethane to the cured polyester resin precursors depends on the particular property of the resultant shaped article which is of interest. For an optimum balance of properties in the shaped article from 40 to 60% by weight of polyurethane precursors and from 60 to 40% by weight of cured polyester resin precursors are preferred.

Where high impact strength is the prime requirement in the shaped article 50% or more by weight of polyurethane precursors within the scope of our invention are preferred and correspondingly 50% by weight or less of cured polyester resin precursors. More preferably from 50 to 80% by weight of polyurethane precursors and from 50 to 20% by weight of cured polyester resin precursors are used as with a larger amount of polyurethane precursors and correspondingly less cured polyester resin precursors the resultant shaped article may have a relatively low heat distortion temperature.

We find that in general the higher is the glass-rubber transition temperature of the cross-linked polyurethane which could be prepared from the precursors therefor the higher is the heat-distortion temperature of the resultant gel-polymerisate of our invention and that for optimum balance of impact strength and heat distortion temperature in the resultant gel-polymerised shaped article it is preferred to use polyurethane precursors capable of forming a cross-linked polyurethane having a glass-rubber transition temperature of at least 35° C.

For optimum properties in the shaped article, e.g. impact strength, it is preferred that the groups in the polyfunctional compound and in the ethylenically unsaturated polyester which are reactive with isocyanate groups should be substantially fully reacted with the polyisocyanate and to this end it is preferred that the molar proportion of groups reactive with isocyanate groups in the polyfunctional compound plus the ethylenically unsaturated polyester, to isocyanate groups in the polyisocyanate be in the range 0.8 to 1 to 1.1 to 1, and more preferably in the range 0.9:1 to 1:1.

Some of the properties of the shaped articles of our invention, for example, the flexural properties and the notched impact strength, may be improved by incorporation of fibrous reinforcing material into the shaped articles. The fibrous material may be, for example, glass fibre, carbon fibre, asbestos fibre or fibrous material derived from an organic polymer, for example, a polyester, e.g. poly(ethylene terephthalate), or a polyamide, e.g. poly(hexamethylene adipamide) or the polyamide derived by polymerisation of E-caprolactam or the corresponding aminocarboxylic acid.

The amount of fibrous material to be incorporated will depend on the desired improvement in the particular property of the shaped article which is of interest. In general from 5 to 50% of fibrous material by weight of the total weight of the fibre reinforced shaped article will suffice. Where it is desirable to effect a substantial improvement in properties from 20 to 50% by weight of fibrous material is preferred.

The fibrous materials may be incorporated into the shaped article by means which will be apparent to those versed in the art of reinforced resins.

Glass fibres may be in any suitable form, e.g. in the form of a matt, ribbons, tapes, continuous fibres or as chopped rovings. Where chopped rovings are used they are preferably of at least ½ inch in length.

According to a further embodiment of our invention we provide a process for the production of a shaped polymeric article which comprises gel-polymerising a homogeneous mixture of polyurethane precursors and cured polyester resin precursors as hereinbefore described and shaping the mixture before the gel-polymerisation has proceeded to the extent that the mixture is intractable.

The requirements of homogeneity are easily determined. Thus in effecting the process of our invention the precursors of the cross-linked polyurethane and the cured polyester resin precursors should be chosen so that they may be mixed to form a homogeneous solution. We have found that provided the components of the mixture initially form a homogeneous solution the mixture generally remains homogeneous during the subsequent gel-polymerisation.

In order that a homogeneous mixture may be formed relatively easily it is preferred that the polyfunctional compound component of the polyurethane precursors has a molecular weight of 1000 or less, and more preferably a molecular weight of 650 or less.

By selection of suitable catalysts and temperatures the gel-polymerisation may be effected in a number of ways in which the saturated polyfunctional compound and the polyisocyanate precursors of the cross-linked polyurethane are substantially fully reacted together and with the ethylenically unsaturated polyester and the vinyl monomer reacted with the polyester by reaction with the ethylenically unsaturated groups in the polyester. For example, the precursors of the crosslinked polyurethane may be substantially fully reacted together and with the ethylenically unsaturated polyester before any substantial reaction has taken place between the polyester and the vinyl monomer. Alternatively, the ethylenically unsaturated polyester may be substantially fully reacted with the vinyl monomer before any substantial reaction between the precursors of the cross-linked polyurethane and the polyester has taken place. In a further embodiment, reaction of the precursors of the cross-linked polyurethane together and with the ethylenically unsaturated polyester, and reaction of the polyester with the vinyl monomer may take place substantially simultaneously.

As will be apparent, the polyurethane precursors used to produce the shaped polymeric articles according to the invention are free of ethylenic unsaturation and thus do not react with the vinyl monomer of the cured polyester resin precursors.

If desired, it can be arranged, for example, by suitable choice of the nature of the components of the mixture and in particular by choice of suitable catalysts, for the precursors of the cross-linked polyurethane to react together and with the ethylenically unsaturated polyester at ambient temperature while reaction between the polyester and the vinyl monomer remains substantially quiescent and then to activate the latter reaction by raising the temperature.

We have found that the temperature at which the gel-polymerisation is effected may have an influence on the properties of the resultant gel-polymerised shaped article, and in particular on the notched impact strength and heat distortion temperature thereof. Thus, we find that in general the notched impact strength and the heat distortion temperature of the gel-polymerisate are greater if substantially the whole of the gel-polymerisation is effected at a temperature which is above the heat distortion temperature of the resultant gel-polymerisate. Of course, the polyurethane precursors and the cured polyester resin precursors may be mixed at a temperature below the heat distortion temperature of the resultant gel-polymerisate, the mixture thereafter being raised to the required temperature. Suitable temperatures at which this preferred embodiment of the process of our invention may be effected may be determined by means of simple experiment.

By heat distortion temperature we mean the temperature determined by application of the test method described in ASTM D648/56 (66 lbs/sq.in). The effect on the properties of the resultant gel-polymerised shaped article produced by operation of this preferred process is generally more marked the more highly cross-linked is the resultant gel-polymerised shaped article.

As stated hereinbefore, catalysts may be used if desired to assist the gel-polymerisation. For example, catalysts for polyurethane formation may be used, e.g. tertiary amines, stannous octoate or dibutyl tin dilaurate. The reaction between the ethylenically unsaturated polyester and the vinyl monomer may also be activated by the presence of a catalyst, for example a peroxide e.g. benzoyl peroxide, cyclohexanone peroxide or ditertiary butyl peroxide, assisted if desired, by the presence of an accelerator, e.g. a dilute solution of a cobalt soap or an amine accelerator.

Suitable shaping methods include casting and compression moulding. For example, a shaped article may be produced by charging the components of the mixture into a suitable mould in which they may be gel-polymerised. The mixture in the mould may be compressed during gel-polymerisation.

We have also found that the shaped article of our invention may also be further shaped when the components of the mixture are in a partially gel-polymerised state and according to a further embodiment of our invention we provide a process for the production of a polymeric article of complex profile which comprises the steps of a. performing a further shaping operation on a tractable shaped article of simple profile formed by partially gel-polymerising a homogeneous mixture of polyurethane precursors and cured polyester resin precursors, as hereinbefore described, and b. causing or allowing the thus further shaped article to retain its shape while completing the gel-polymerisation.

The further shaping process of our invention may be effected on any suitably shaped partially gel-polymerised article of simple profile which may, if desired contain fibrous reinforcement, but it is particularly adapted to the further shaping of a partially gel-polymerised article in the form of a sheet. The further shaping may be effected, for example, by causing the shaped article of simple profile to conform to the contours of a mould, for example, by mechanical means, or pneumatically, or by a combination thereof. The shaped article of simple profile, e.g. a sheet, may be shaped, for example, by pressing between the co-operating parts of a mould or by draping over a mould. A particularly preferred method of further shaping is vacuum forming in a mould.

The thus further shaped article may be removed from the mould and the gel-polymerisation completed, e.g. by heating in an oven, provided the article is able to retain its shape. Alternatively, and particularly if the thus further shaped article is not able to retain its shape unaided, the gel-polymerisation may be completed by further heating of the article while its shape is maintained by the mould.

The extent of reaction between the polyurethane precursor components and the cured polyester resin precursors in the article of simple profile to be used in the further shaping process of our invention should be at least such as to enable the article of simple profile to be conveniently handleable. Thus, where the mixture contains only a low concentration of polyurethane precursors it may be desirable to react the precursors with the ethylenically unsaturated polyester almost completely and even partially to react the polyester with the vinyl monomer before effecting the further shaping process of our invention. On the other hand, where the mixture comprises a large proportion of polyurethane precursors it may not be necessary to complete the reaction between the precursors and the ethylenically unsaturated polyester before effecting the further shaping process. The composition should, of course, not be gel-polymerised to such an extent as to prevent the further shaping process. A suitable amount of gel-polymerisation will readily be determined by means of simple experiment. Suitably the mixture may be reacted to the extent that it achieves the consistency of an uncured rubber.

The invention is now illustrated by the following Examples in which all parts are expressed as part by weight.

Impact strengths were measured on a Hounsfield Impact machine on unnotched samples of dimensions 2 in. × ¼ in. × ⅛ in. Notched impact strengths were measured on similar samples having a ⅛ in. deep notch cut in the 2 × ¼ in side, the notched radius being 0.01 inch.

Falling weight impact strengths were measured following the procedure of BS 2782/3/306B with the exception that the weight was dropped from a height of 3 ft. instead of from 2 ft.

Glass-rubber transition temperatures (Tg) were measured using a DuPont 900 Thermal Analyser, the rate of heating of the sample being 20° C min$^{-1}$.

Heat distortion temperatures were measured either (Example 14) by supporting a sample of dimensions 1½ inch × ¼ inch × 1/16 inch on the 1½ × ¼ inch face, suspending a 20 g. sample at a distance of 1 inch from the point of support and heating the sample in an oven at a rate of heating of 2° C per minute, or (Examples 15 to 18, 21 to 23) by following the procedure described in ASTM D648/56.

Initial moduli were measured on a Hounsfield Tensometer using an Extensometer device at a strain rate of 5% per minute using shaped specimens having dimensions 4 in. × ¼ in. × ⅛ in.

Flexural moduli and flexural yield and breaking strengths were measured on a Hounsfield Tensometer at a strain rate of 1% per minute using shaped specimens of dimensions 3 in. × ¼ in. × ⅛ in. with the exception that in Examples 8 (G,H,I) 10-13, 15-18, 22 and 23 a strain rate of 10% per minute was used.

Tensile yield strengths, tensile breaking strengths and elongations to break were measured on a Hounsfield Tensometer using dumbell shaped specimens having a neck of dimensions 2 in. × ⅜ in. × ¼ in.

EXAMPLE 1

63 Parts of 4:4'-diphenyl methane diisocyanate were charged to a flask and heated at a temperature of 50° C until clear.

110 Parts of a mixture of 38% by weight of styrene and 62% by weight of an unsaturated polyester, the mixture having an acid value of 25 mg. KOH per g. and sold commercially as Crystic 199 by Scott Bader and Co. Ltd., was similarly heated to a temperature of 50° C and mixed with the 4:4'-diphenyl methane diisocyanate. To the thus formed solution there was added 47 parts of oxypropylated trimethylol propane of molecular weight 310, which had previously been heated to a temperature of from 40° to 50° C, and the resulting clear solution was allowed to cool to room temperature. 4.4 Parts of a dispersion of cyclohexanone peroxide (Catalyst Paste H), 4.4 parts of dilute solution of a cobalt soap (Accelerator E), each supplied by Scott Bader and Co. Ltd., and 0.1 part of dibutyl tin dilaurate were added to the clear solution.

The solution which contained 50% by weight of polyurethane precursors and 50% by weight of cured polyester resin precursors was degassed by connecting the flask containing the solution to a vacuum. The degassed solution was poured into a mould formed by a ⅛ in. wide by ⅛ in. deep neoprene rubber gasket placed on a 12 in. × 12 in. aluminium plate. The mould was closed by another 12 in. × 12 in. aluminium plate and the plates were clamped together by means of spring clips. The mould and contents were allowed to stand at room temperature for 18 hours and were then heated in an oven at 80° C for 5 hours followed by heating for 18 hours at 130° C. The mould was then removed from the oven, allowed to cool and the moulded sheet removed.

The sheet, which was transparent, had the following properties:

| | |
|---|---|
| Flexural modulus | 31,000 Kg.cm$^{-2}$ |
| Flexural breaking strength | 1,216 Kg.cm$^{-2}$ |
| Initial modulus | 33,500 Kg.cm$^{-2}$ |
| Tensile yield strength | 873 Kg.cm$^{-2}$ |
| Tensile breaking strength | 873 Kg.cm$^{-2}$ |
| Elongation to break | 18.5% |
| Impact strength, notched | 3.7 Kg.cm.cm$^{-2}$ |
| unnotched | 46.4 Kg.cm.cm$^{-2}$ |

In a further experiment, a homogeneous solution of 63 parts of 4:4'-diphenyl methane diisocyanate, 110 parts of Crystic 199, 47 parts of oxypropylated trimethylol propane of molecular weight 310, 4.4 parts of ditertiary butyl peroxide and 0.1 part of dibutyl tin dilaurate was formed and degassed following the above procedure.

Three random chopped glass fibre matts (Type HPE Fibre Glass Ltd) were placed in a mould formed by a ⅛ in. wide by ⅛ in. deep brass gasket placed on a 6 in. × 6 in. aluminium plate. The aluminium plate had previously been covered by a poly(ethylene terephthalate) film. The mould was closed by placing a poly(ethylene terephthalate) film and a 6 in. × 6 in. aluminium plate over the gasket and the mould was heated to 100° C in an oven. The mould was then removed from the oven, one of the aluminium plates and poly (ethylene terephthalate) films was removed, the mould was filled with the degassed mixture, the poly(ethylene terephalate) film and aluminium plates were replaced, a 10 Kg. weight was placed on the plate and the filled mould was allowed to stand for ½ hour. The mould was then placed in a press and heated for ½ hour at 130° C under an applied pressure of 1000 lb./sq/in. The mould was removed from the press and the sheet was removed from the mould and heated in an oven at 130° C for 2½ hours. The moulded sheet, containing 24% by weight of glass fibre as a proportion of the total weight of the sheet, had the following properties:

| Flexural modulus | 63,300 Kg.cm$^{-2}$ |
| Flexural breaking strength | 1,370 Kg.cm$^{-2}$ |
| Impact strength, notched | 40 Kg.cm.cm$^{-2}$ |
| , unnotched | 63.6 Kg.cm.cm$^{-2}$ |

EXAMPLE 2

Following the procedure of Example 1, two homogeneous solutions were prepared from respectively 45 and 70 parts of 4:4'-diphenyl methane diisocyanate, 34 and 56 parts of oxypropylated trimethylol propane of molecular weight 310, and 119 and 84 parts of Crystic 199, the solutions containing respectively 40 and 60% by weight of polyurethane precursors and 60 and 40% by weight of cured polyester resin precursors. To each solution there was added 4% of catalyst paste H and 4% of Accelerator E by weight of Crystic 199 and 0.2% of dibutyl tin dilaurate by weight of 4:4'-diphenyl methane diisocyanate plus oxypropylated trimethylol propane. Each mixture was charged to a mould and heated following the procedure of Example 1. The properties of the transparent moulded sheets are shown in Table 1 as Experiments A and B respectively.

By way of comparison and in order to show the properties of a product prepared from the cured polyester resin precursors alone, 200 parts of Crystic 199 and 8 parts each of Catalyst Paste H and Accelerator E were mixed at room temperature, degassed and charged to a mould following the procedure of Example 1. The mould and contents were allowed to stand at room temperature for 18 hours and were then heated in an oven for 5 hours at 80° C and for 18 hours at 140° C. The properties of the moulded sheet are shown as Experiment C in Table 1.

By way of further comparison and in order to show the properties of the product prepared from the polyurethane precursors alone, 117.5 parts of 4:4'-diphenyl methane diisocyanate and 97 parts of oxypropylated trimethylol propane of molecular weight 310 were mixed at 50° C, degassed and charged to a mould following the procedure of Example 1. The mould and contents were allowed to stand at room temperature for 18 hours and were then heated in an oven for 5 hours at 80° C and for a further 18 hours at 120° C. The properties of the moulded sheet which had a Tg of 122° C are shown as Experiment D in Table 1.

In a further experiment, a homogeneous solution of 70 parts of 4:4'-diphenyl methane diisocyanate, 56 parts of oxypropylated trimethylol propane, 84 parts of Crystic 199, 3.4 parts of ditertiary butyl peroxide and 0.25 parts of dibutyl tin dilaurate was formed and degassed following the procedure of Example 1, the solution containing 60% by weight of polyurethane precursors and 40% by weight of cured polyester resin precursors.

Two random chopped glass fibre matts (Type FGE 2000 Fibre Glass Ltd.) were placed in a mould, the degassed mixture was charged to the mould and the mould and contents were allowed to stand and were then heated following the procedure of the further experiment described in Example 1. The sheet, which was removed from the mould, was heated for a further 2½ hours in an oven at 130° C.

The properties of the moulded sheet, containing 16% by weight of glass fibres as a proportion of the total weight of the sheet, are shown as Experiment E of Table 1.

EXAMPLE 3

Three homogeneous solutions were prepared at room temperature from respectively 77, 60 and 50 parts of Suprasec DN (a polyfunctional isocyanate of functionality 2.7 and containing 4:4'-diphenyl methane diisocyanate and other isocyanates of higher functionality and supplied by ICI Ltd.), 52, 39 and 31 parts of oxypropylated trimethylol propane of molecular weight 310, and 86, 99 and 120 parts of Crystic 199. The solutions contained respectively 60, 50 and 40% by weight of polyurethane precursors and 40, 50 and 60% by weight of cured polyester resin precursors. To each solution 4% of Catalyst Paste H and 4% of Accelerator E by weight of Crystic 199 were added together with 0.1% of dibutyl tin dilaurate by weight of Suprasec DN plus oxypropylated trimethylol propane. Each of the mixtures was degassed and charged to a separate mould following the procedure of Example 1 and the moulds were allowed to stand at room temperature for 18 hours and were then heated in an oven at 80° C for 5 hours and at 130° C for 18 hours.

The properties of the transparent moulded sheets are shown in Table 2 as Experiments A, B and C.

By way of comparison and in order to show the properties of the product prepared from the polyurethane precursors alone, 122 parts of Suprasec DN and 88 parts of oxypropylated trimethylol propane of molecular weight 310 were mixed at 60° C, and degassed and charged to a mould following the procedure of Example 1. The mould was allowed to stand at room temperature for 18 hours and was then heated in an oven at 80° C for 5 hours and at 120° C for 18 hours.

The properties of the moulded sheet are shown in Table 2 as Experiment D.

TABLE 1

| Experiment | Flexural Modulus Kg.cm$^{-2}$ | Flexural Breaking Strength Kg.cm$^{-2}$ | Initial Modulus Kg.cm$^{-2}$ | Tensile Yield Strength Kg.cm$^{-2}$ | Tensile Breaking Strength Kg.cm$^{-2}$ | Elongation to break % | Impact Strength Kg.cm.cm$^{-2}$ Notched | Unnotched |
|---|---|---|---|---|---|---|---|---|
| A | 30,500 | 1,285 | 37,000 | — | 816 | 10 | 3.8 | 24.5 |
| B | 30,000 | 1,220 (yield) | 34,000 | 846 | 760 | 14 | 4.9 | 61.0 |
| C | 33,500 | 820 | 39,000 | — | 430 | 1.8 | — | 6.7 |
| D | 25,500 | 1,100 | 28,000 | 712 | — | 12.8 | 6.1 | >112 |
| E | 48,200 | 1,310 | — | — | — | 19.5 | — | — |

TABLE 2

| Experiment | Flexural Modulus Kg.cm$^{-2}$ | Flexural Breaking Strength Kg.cm$^{-2}$ | Initial Modulus Kg.cm$^{-2}$ | Tensile Yield Strength Kg.cm$^{-2}$ | Tensile Breaking Strength Kg.cm$^{-2}$ | Elongation to break % | Impact Strength Kg.cm.cm$^{-2}$ Notched | Unnotched |
|---|---|---|---|---|---|---|---|---|
| A | 28,500 | 1,150 | 34,500 | — | 720 | 10 | 3.5 | 29.8 |
| B | 30,000 | 1,300 | 35,500 | — | 790 | 9.5 | 2.5 | 35.6 |

TABLE 2-continued

| Experiment | Flexural Modulus Kg.cm$^{-2}$ | Flexural Breaking Strength Kg.cm$^{-2}$ | Initial Modulus Kg.cm$^{-2}$ | Tensile Yield Strength Kg.cm$^{-2}$ | Tensile Breaking Strength Kg.cm$^{-2}$ | Elongation to break % | Impact Strength Kg.cm.cm$^{-2}$ Notched | Unnotched |
|---|---|---|---|---|---|---|---|---|
| C | 31,500 | 1,280 | 36,000 | — | 680 | 7.5 | 1.8 | 29.1 |
| D | 27,000 | 1,190 (yield) | 29,500 | — | — | — | 3.9 | 61.5 |

EXAMPLE 4

Five homogeneous solutions were prepared at 50° C from respectively 23, 40.5, 49, 58 and 76 parts of 4:4'-diphenyl methane diisocyanate, 17, 39.5, 50, 62 and 84 parts of oxypropylated glycerol of molecular weight 425, and 160, 120, 99, 80 and 40 parts of Crystic 199. To each solution, 4% of Catalyst Paste H and 4% of Accelerator E by weight of Cyrstic 199 were added together with 0.1% of dibutyl tin dilaurate by weight of 4:4'-diphenyl methane diisocyanate plus oxypropylated glycerol. The solutions contained respectively 20, 40, 50, 60 and 80% by weight of polyurethane precursors and 80, 60, 50, 40 and 20% by weight of cured polyester resin precursors.

The solutions were degassed and charged to separate moulds following the procedure of Example 1 and allowed to stand at room temperature for 18 hours. Each mould was then heated in an oven at 80° C for 5 hours and for a further 18 hours at 130° C.

The properties of the transparent moulded sheets are shown respectively as Experiments A, B, C, D and E in Table 3.

By way of comparison and in order to show the properties of the product prepared from the polyurethane precursors alone, 90 parts of 4:4'-diphenyl methane diisocyanate and 102 parts of oxypropylated glycerol of molecular weight 425 were mixed at 50° C, degassed and charged to a mould following the procedure of Example 1. The mould and contents were allowed to stand at room temperature for 18 hours and were then heated in an oven at 80° C for 5 hours and at 130° C for 18 hours.

The properties of the moulded sheet which had a Tg of 75° C are shown in Table 3 as Experiment F.

EXAMPLE 5

Three homogeneous solutions were prepared at 50° C from respectively 45.5, 55 and 66 parts of 4:4'-diphenyl methane diisocyanate, 34.5, 43, and 54 parts of oxypropylated glycerol of molecular weight 315, and 120, 98 and 80 parts of Crystic 199. To each solution, 4% of Catalyst Paste H and 4% of Accelerator E by weight of Crystic 199 were added together with 0.1% of dibutyl tin dilaurate by weight of 4:4'-diphenyl methane diisocyanate plus oxypropylated glycerol, the solutions containing respectively 40%, 50% and 60% by weight of polyurethane precursors and 60%, 50% and 40% by weight of cured polyester resin precursors.

The solutions were degassed, charged to separate moulds, and allowed to stand and then heated following the procedure of Example 4.

The properties of the transparent moulded sheets are shown in Table 4 as Experiments A, B and C respectively.

The polyurethane precursors, 4:4'-diphenyl methane diisocyanate and oxypropylated glyerol of molecular weight 315, are capable of yielding a cross-linked polyurethane having a Tg of 109° C.

EXAMPLE 6

Two homogeneous solutions were prepared at 50° C from respectively 33 and 40 parts of 4:4'-diphenyl methane diisocyanate, 47 and 58 parts of oxypropylated glycerol of molecular weight 625, and 120 and 98 parts of Crystic 199. To each solution, 4% of Catalyst Paste H and 4% of Accelerator E by weight of Crystic 199 were added together with 0.1% of dibutyl tin dilaurate by weight of 4:4'-diphenyl methane diisocyanate plus oxypropylated glycerol, the solutions containing respec-

TABLE 3

| Experiment | Flexural Modulus Kg.cm$^{-2}$ | Flexural Breaking Strength Kg.cm$^{-2}$ | Initial Modulus Kg.cm$^{-2}$ | Tensile Yield Strength Kg.cm$^{-2}$ | Tensile Breaking Strength Kg.cm$^{-2}$ | Elongation to break % | Impact Strength Kg.cm.cm$^{-2}$ Notched | Unnotched |
|---|---|---|---|---|---|---|---|---|
| A | 33,000 | 1,150 | — | none | — | — | — | 9.1 |
| B | 34,000 | 1,275 | 37,500 | none | 920 | 12 | 2.2 | 32.4 |
| C | 33,500 | 1,150 | 35,000 | 800 | 700 | 13 | 2.1 | 34 |
| D | 31,500 | 935 | 33,000 | 740 | 690 | 14 | 4.2 | 87 |
| E | 28,000 | 870 | 29,000 | 760 | — | — | 4.9 | 116 |
| F | 22,000 | 890 (yield) | 27,000 | 510 | 440 | 13 | 5.4 | >120 | tively 40% and 50% by weight of polyurethane precursors and 60% and 50% by weight of cured polyester resin precursors.

TABLE 4

| Experiment | Flexural Modulus Kg. cm$^{-2}$ | Flexural Breaking Strength Kg. cm$^{-2}$ | Initial Modulus Kg. cm$^{-2}$ | Tensile Yield Strength Kg. cm$^{-2}$ | Tensile Breaking Strength Kg. cm$^{-2}$ | Elongation to break % | Impact Strength Kg.cm.cm$^{-2}$ Notched | Unnotched |
|---|---|---|---|---|---|---|---|---|
| A | 33,000 | 1,250 | 37,700 | — | — | — | 3.0 | 24.5 |
| B | 33,000 | 1,300 | 37,000 | — | 941 | — | 3.3 | 33.8 |
| C | 31,000 | 1,260 (yield) | 37,600 | — | — | — | 4.5 | 50.7 |

TABLE 5

| Experiment | Flexural Modulus Kg. cm$^{-2}$ | Flexural Breaking Strength Kg. cm$^{-2}$ | Initial Modulus Kg. cm$^{-2}$ | Tensile Yield Strength Kg. cm$^{-2}$ | Tensile Breaking Strength Kg. cm$^{-2}$ | Elongation to break % | Impact Strength Kg.cm.cm$^{-2}$ Notched | Unnotched |
|---|---|---|---|---|---|---|---|---|
| A | 31,00 | 1,020 | 33,000 | 750 | 750 | 12 | 3.0 | 20.4 |
| B | 29,000 | 970 (yield) | 31,500 | 575 | 535 | 21 | 3.5 | 37.5 |

The solutions were degassed, charged to separate moulds, and allowed to stand and then heated following the procedure of Example 4. The properties of the transparent moulded sheets are shown in Table 5 as Experiments A and B respectively.

The polyurethane precursors, 4:4'-diphenyl methane diisocyanate and oxypropylat d glycerol of molecular weight 625, are capable of yielding a cross-linked polyurethane having a Tg of 29° C.

EXAMPLE 7

Following the procedure of Example 1, two homogeneous solutions were prepared from respectively 126 and 140 parts of 4:4'-diphenyl-methane diisocyanate, 94 and 113 parts of oxypropylated trimethylol propane of molecular weight 310, and 220 and 165 parts of a mixture containing 40% by weight of styrene and 60% by weight of an unsaturated polyester having an acid value of 23 mg KOH per g and prepared by condensation of fumaric acid and phthalic anhydride with propylene glycol in a molar proportion of 0.55 to 0.45 to 1.1. The homogeneous solutions contained respectively 50 and 60% by weight of polyurethane precursors and 50 and 40% by weight of cured polyester resin precursors.

To each homogeneous solution there was then added 4% of catalyst paste H and 2% of Accelerator E by weight of the unsaturated polyester plus styrene and 0.05% by weight of dibutyl tin dilaurate by weight of 4:4'-diphenylmethane diisocyanate plus oxypropylated trimethylol propane. Each solution was degassed, charged to a separate mould and allowed to stand and then heated following the procedure of Example 1. The transparent sheets removed from the mould had the properties indicated as A and B in Table 6.

In two further experiments, two homogeneous solutions were prepared following the above procedure except that a mixture of 47% by weight of styrene and 53% by weight of an unsaturated polyester based on bisphenol A, the mixture having an acid value of 13 mg. KOH per g and being sold commercially as Crystic 197 by Scott Bader and Co. Ltd., was used in place of the mixture of styrene and unsaturated polyester used above. To each solution there was added 2% of Catalyst Paste B (a dispersion of benzoyl peroxide supplied by Scott Bader and Co. Ltd.) by weight of Crystic 197 and 0.05% by weight of dibutyl tin dilaurate be weight of 4:4'-diphenylmethane diisocyanate plus oxypropylated trimethylol propane and the solutions were degassed charged to separate moulds and allowed to stand and then heated following the procedure described in Example 1.

The transparent sheets removed from the moulds had the properties indicated as C and D in Table 6.

TABLE 6

| Experiment | Flexural Modulus Kg cm$^{-2}$ | Flexural Yield Strength Kg cm$^{-2}$ | Initial Modulus Kg cm$^{-2}$ | Impact Strength Kg cm cm$^{-2}$ Notched | Unnotched |
|---|---|---|---|---|---|
| A | 35,000 | 1,440 | — | 2.5 | 40.3 |
| B | 32,000 | 1,330 | 34,000 | 4.2 | 87.4 |
| C | 31,000 | 1,350 | 32,500 | — | 53.7 |
| D | 31,500 | 1,160 | 29,500 | 5.7 | 55.6 |
| E | 29,500 | 850 | 34,000 | to brittle to notch | 1.4 |

By way of comparison and in order to show the properties of the product prepared from the cured polyester resin precursors along, 120 parts of Crystic 197, 2.4 parts of Catalyst Paste B and 2.4 parts of Accelerator D (an amine accelerator supplied by Scott Bader and Co. Ltd) were mixed at room temperature, degassed and charged to a mould following the procedure of Example 1. The mould and contents were allowed to stand at room temperature for 18 hours and were then heated in an oven at 80° C for 5 hours and at 140° C for 18 hours. The properties of the moulded sheet are indicated as E in Table 6.

EXAMPLE 8

Following the procedure of Example 1, three homogeneous solutions were prepared from respectively 25, 22 and 18 parts of 4:4'-diphenyl methane diisocyanate, 20, 23 and 27 parts of oxypropylated glycerol of molecular weight respectively 315, 425 and 625, and in each case 30 parts of a mixture of 40% by weight of styrene and 60% by weight of an unsaturated polyester having an acid value of 23 mg KOH per g. and prepared by condensation of fumaric acid and phthalic anhydride with propylene glycol in a molar proportion of 0.55 to 0.45 to 1.1. Each of the thus formed homogeneous solutions contained 60% by weight of polyurethane precursors and 40% by weight of cured polyester resin precursors.

To each solution there was added 0.6 part of Catalyst Paste B and 0.05 part of dibutyl tin dilaurate. Each of the solutions was degassed and charged to a mould following the procedure of Example 1 and allowed to stand at room temperature for 18 hours and then heated in an oven at 130° C for 2 hours.

The transparent sheets removed from the moulds had the properties indicated as A, B and C in Table 7.

TABLE 7

| Experiment | Flexural Modulus Kg cm$^{-2}$ | Flexural Yield Strength Kg cm$^{-2}$ | Initial Modulus Kg cm$^{-2}$ | Impact Strength Kg cm cm$^{-2}$ Notched | Unnotched | Falling Weight Impact Strength ft.lb. | Heat Distortion Temperature °C 66 lb/sq.in. | 264 lb/sq. in. |
|---|---|---|---|---|---|---|---|---|
| A | 33,000 | 1,515 | — | 3.2 | 44.2 | | | |
| B | 29,500 | 1,245 | 33,500 | 2.0 | 29.1 | | | |
| C | 29,500 | 1,015 | 32,500 | 2.6 | 50.8 | | | |
| D | 32,500 | 1,385 | 37,000 | 3.6 | 61.4 | | | |
| E | 29,000 | 1,210 | 33,000 | 4.0 | 72.6 | | | |

TABLE 7-continued

| Experiment | Flexural Modulus Kg cm$^{-2}$ | Flexural Yield Strength Kg cm$^{-2}$ | Initial Modulus Kg cm$^{-2}$ | Impact Strength Kg cm cm$^{-2}$ | | Falling Weight Impact Strength ft.lb. | Heat Distortion Temperature °C | |
|---|---|---|---|---|---|---|---|---|
| | | | | Notched | Unnotched | | 66 lb/sq.in. | 264 lb/sq. in. |
| F | 28,500 | 950 | 31,500 | 4.9 | 88.7 | | | |
| G | 30,500 | 1,565 | — | 2.3 | 32.2 | 2.4 to 3.0 | 119 | 99 |
| H | 30,500 | 1,295 | — | 1.9 | 36.6 | 2.4 to 3.0 | 80 | 67 |
| I | 25,500 | 890 | 32,000 | 4.0 | 54.3 | 3.6 | 67 | — |

In three further experiments, three homogeneous solutions were prepared following the above procedure except that 99, 73, and 96 parts of 4:4'-diphenylmethane diisocyanate, 78, 77 and 146 parts of oxypropylated glycerol of molecular weight respectively 315, 425 and 625, and 118, 99 and 160 parts of Crystic 197 were used. Each of the thus formed homogeneous solutions contained 60% by weight of polyurethane precursors and 40% by weight of cured polyester resin precursors.

There was then added to each solution 1% of ditertiary butyl peroxide by weight of Crystic 197 and the solutions were degassed following the procedure of Example 1 and poured into separate moulds which had previously been heated to 80° C. The moulds were then heated in an oven at 130° C for 2 hours and the properties of the transparent sheets removed from the moulds are indicated as D, E and F in Table 7.

In three further experiments, three homogeneous solutions were prepared following the above procedure except that 140, 123 and 96 parts of 4:4'-diphenyl methane diisocyanate, 100, 117 and 144 parts of oxypropylated glycerol of molecular weight respectively 315, 425 and 625, and, in each case, 160 parts of a mixture of 35% by weight of styrene and 65% by weight of an unsaturated polyester having an acid value of 10 mg KOH per g. and prepared by condensation of fumaric acid and propylene glycol in a molar proportion of 1.0 to 1.1 were used. To each solution there was then added 3.2 parts of Catalyst paste B and 3.2 parts of Accelerator D and the solutions were degassed, charged to separate moulds and the moulds were allowed to stand at room temperature for 1½ hours and were then heated in an oven at 140° C for 2 hours. The properties of the transparent sheets removed from the moulds are indicated as G, H and I in Table 7.

EXAMPLE 9

A homogeneous solution was prepared following the procedure of Example 1 from 140 parts of 4:4'-diphenylmethane diisocyanate, 113 parts of oxypropylated trimethylol propane of molecular weight 310 and 168 parts of a mixture of 40% by weight of styrene and 60% by weight of an unsaturated polyester having an acid value of 142 mg KOH per g and prepared by condensation of fumaric acid and phthalic anhydride with cyclohexane-1,4-diol in a molar proportion of 0.55 to 0.45 to 1.1 The solution contained 60% by weight of polyurethane precursors and 40% by weight of cured polyester resin precursors.

8.4 parts of Catalyst Paste H and 0.1 part of dibutyl tin dilaurate were added to the solution and the solution was degassed, charged to a mould and allowed to stand and then heated following the procedure of Example 1.

The transparent sheet removed from the mould had the following properties:

| | |
|---|---|
| Flexural modulus | 33,500 Kg cm$^{-2}$ |
| Flexural yield strength | 1360 Kg cm$^{-2}$ |
| Initial modulus | 38,000 Kg cm$^{-2}$ |
| Impact strength: notched | 1.4 Kg cm cm$^{-2}$ |
| unnotched | 35.7 Kg cm cm$^{-2}$ |

EXAMPLE 10

A homogeneous solution was prepared following the procedure of Example 1 from 35 parts of 4:4'-diphenylmethane diisocyanate, 28 parts of oxypropylated trimethylol propane of molecular weight 310 and 42 parts of a mixture of 40% by weight of styrene and 60% by weight of an unsaturated polyester having an acid value of 31 mg KOH per g and prepared by condensation of maleic acid and phthalic anhydride with propylene glycol in a molar proportion of 0.5 to 0.5 to 1.1 The solution contained 60% by weight of polyurethane precursors and 40% by weight of cured polyester resin precursors.

0.8 part of catalyst Paste B and 0.8 part of Accelerator D was added to the solution and the solution was degassed, charged to a mould and allowed to stand and then heated following the procedure of Example 1.

The transparent sheet removed from the mould had the following properties:

| | |
|---|---|
| Flexural modulus | 34,500 Kg cm$^{-2}$ |
| Flexural yield strength | 1305 Kg cm$^{-2}$ |
| Initial modulus | 34,000 Kg cm$^{-2}$ |
| Impact strength: notched | 1.6 Kg cm cm$^{-2}$ |
| unnotched | 29.8 Kg cm cm$^{-2}$ |

EXAMPLE 11

A homogeneous solution was prepared following the procedure of Example 1 from 44.5 parts of 4:4'-diphenylmethane diisocyanate, 44.5 parts of oxypropylated glycerol of molecular weight 425 and 56 parts of a mixture of 30% by weight of methyl methacrylate and 70% by weight of an unsaturated polyester having an acid value of 40 gm KOH per g and prepared by condensation of fumaric acid and isophthalic acid with propylene glycol in a molar proportion of 0.75 to 0.25 to 1.1. The solution contained 61% by weight of polyurethane precursors and 39% by weight of cured polyester resin precursors.

1.2 parts of Catalyst Paste B and 1.2 parts of Accelerator D were added to the solution which was then degassed and charged to a mould following the procedure of Example 1. The mould was allowed to stand at room temperature for 1 hour and was then heated in an oven at 140° C for 1½ hours.

The properties of the transparent sheet removed from the mould are indicated as A in Table 8.

In a further experiment, the above procedure was repeated except that a mixture of 25% by weight of divinyl benzene and 75% by weight of unsaturated polyester were used in place of the mixture of 30% by weight of methyl methacrylate and 70% by weight of the same unsaturated polyester.

The properties of the transparent sheet removed from the mould are indicated as B in Table 8.

TABLE 8

| Experiment | Flexural Modulus Kg cm$^{-2}$ | Flexural Yield Strength Kg cm$^{-2}$ | Initial Modulus Kg cm$^{-2}$ | Impact Strength Kg cm cm$^{-2}$ | |
|---|---|---|---|---|---|
| | | | | Notched | Unnotched |
| A | 31,500 | 1,245 | 33,500 | 1.5 | 32.6 |
| B | 31,500 | 1,250 | 34,500 | 2.3 | 40.4 |

EXAMPLE 12

A homogeneous solution was prepared following the procedure of Example 1 from 140 parts of 4:4'-diphenylmethane diisocyanate, 113 parts by weight of oxypropylated trimethylol propane of molecular weight 310 and 168 parts of a mixture of 10% by weight of diallyl phthalate and 90% by weight of an unsaturated polyester having an acid value of 12.4 mg KOH per g and formed by condensation of fumaric acid and phthalic anhydride with neopentyl glycol in a molar proportion of 0.5 to 0.5 to 1.1. The solution contained 60% by weight of polyurethane precursors and 40% by weight of cured polyester resin precursors.

6.8 parts of Catalyst Paste H and 0.1 part of dibutyl tin dilaurate were added to the solution which was then degassed and charged to a mould following the procedure of Example 1. The mould was allowed to stand at room temperature for 18 hours and was then heated in an oven at 80° C for 2 hours and at 130° C for 5 hours. The transparent sheet removed from the mould had the following properties:

| Flexural modulus | 31,000 Kg cm$^{-2}$ |
|---|---|
| Flexural yield strength | 1,070 Kg cm$^{-2}$ |

EXAMPLE 13

A homogeneous solution was prepared following the procedure of Example 1 from 35.5 parts of 4:4'-diphenylmethane diisocyanate, 36.5 parts of oxypropylated glycerol of molecular weight 425 and 48 parts of a mixture of 40% by weight of vinyl toluene and 60% by weight of an unsaturated polyester having an acid value of 12 mg KOH per g and prepared by condensation of phthalic anhydride and fumaric acid with propylene glycol in a molar porportion of 2.4 to 2.0 to 5.0. The solution contained 60% by weight of polyurethane precursors and 40% by weight of cured polyester resin precursors.

1.0 Part of Catalyst Paste B and 1.0 part of Accelerator D were added to the solution and the solution was then degassed and charged to a mould following the procedure of Example 1. The mould was allowed to stand at room temperature for 1 hour and was then heated in an oven at 140° C for 2 hours. The transparent sheet removed from the mould had the following properties:

| Flexural modulus | 28,500 Kg cm$^{-2}$ |
|---|---|
| Flexural yield strength | 1,205 Kg cm$^{-2}$ |
| Impact strength: notched | 3.0 Kg cm. cm$^{-2}$ |
| unnotched | 54.2 Kg cm cm$^{-2}$ |

EXAMPLE 14

A. A homogeneous solution was prepared following the procedure of Example 1, from 16 parts of 4:4'-diphenyl methane diisocyanate, 26 parts of a condensation product prepared by reaction of glycerol and ethylene glycol with adipic acid in a molar proportion of 1 to 2.2 to 2, said condensation product having an acid value of 29 mg. KOH per g. and a hydroxyl value of 278 mg. KOH per g., and 28 parts of Crystic 199. The solution contained 60% by weight of polyurethane precursors and 40% by weight of cured polyester resin precursors.

0.6 part of Catalyst Paste B and 0.05 part of dibutyl tin dilaurate were added to the solution which was then degassed and charged to a mould following the procedure of Example 1. The mould was then allowed to stand at room temperature for 1 hour and was then heated in an oven at 80° C for 2 hours and 130° C for 18 hours. The properties of the transparent sheet removed from the mould are given in Table 9.

B. By way of comparison and in order to show the properties of the product prepared from the polyurethane precursors alone a homogeneous solution was prepared at 60° C from 51.5 parts of 4:4'-diphenyl methane diisocyanate and 88.5 parts of the condensation product described in A above. The solution was degassed, charged to a mould and allowed to stand and then heated following the procedure described in A above. The properties of the sheet removed from the mould are given in Table 9.

C. The procedure described in A above was followed except that 20.8 parts of 4:4'-diphenyl methane diisocyanate and 21.2 parts of a condensation product prepared by reacting trimethylol propane and diethylene glycol with adipic acid in a molar proportion of 1 to 1 to 1 were used, said condensation product having an acid value of 3.1 mg. KOH per g. and a hydroxyl value of 457 mg. KOH per g., and the mould and contents were allowed to stand at room temperature for 1 hour and were then heated in an oven at 130° C for 2 hours. The solution contained 60% by weight of polyurethane precursors and 40% by weight of cured polyester resin precursors. The properties of the transparent sheet removed from the mould are given in Table 9.

D. By way of comparison and in order to show the properties of the product prepared from the polyurethane precursors alone, a homogeneous solution was prepared at 60° C from 35 parts of 4:4'-diphenyl methane diisocyanate and 35 parts of the condensation product described in C above. The solution was degassed, charged to a mould and allowed to stand and then heated following the procedure described in C above. The properties of the sheet removed from the mould are given in Table 9.

TABLE 9

| Experiment | Flexural Modulus Kg cm$^{-2}$ | Flexural Yield Strength Kg cm$^{-2}$ | Initial Modulus Kg cm$^{-2}$ | Impact Strength Kg cm cm$^{-2}$ | | Heat Distortion Temperature ° C |
|---|---|---|---|---|---|---|
| | | | | Notched | Unnotched | |
| A | 30,000 | 1,090 | 34,500 | 6.4 | 51.2 | — |

TABLE 9-continued

| Experiment | Flexural Modulus Kg cm$^{-2}$ | Flexural Yield Strength Kg cm$^{-2}$ | Initial Modulus Kg cm$^{-2}$ | Impact Strength Kg cm cm$^{-2}$ | | Heat Distortion Temperature °C |
|---|---|---|---|---|---|---|
| | | | | Notched | Unnotched | |
| B | 17,500 | 620 | 27,000 | 5.8 | 114 | — |
| C | 33,000 | 1,400 | 39,500 | 4.0 | 56.7 | 126 |
| D | 27,000 | 1,110 | 28,500 | 9.1 | >136 | 98 |
| E | 33,000 | 1,430 | 34,000 | 3.9 | 60.1 | 128 |
| F | 27,000 | 1,145 | 29,500 | 6.4 | >141 | 114 |

E. The procedure described in C above was followed except that a condensation product formed by reacting trimethylol propane, propylene glycol and adipic acid was used having an acid value of 2 mg. KOH per g. and a hydroxyl value of 458 kg. KOH per g. The homogeneous solution which was prepared contained 60% by weight of polyurethane precursors and 40% by weight of cured polyester resin precursors. The properties of the transparent sheet removed from the mould are given in Table 9.

F. By way of comparison and in order to show the properties of the product prepared from the polyurethane precursors alone, the procedure described in D above was followed except that the condensation product described in E above was used. The properties of the transparent sheet removed from the mould are given in Table 9.

EXAMPLE 15

A. A homogeneous solution was prepared following the procedure of Example 14A above from 28 parts of Crystic 199, 19.4 parts of 4:4'-diphenyl methane diisocyanate and 22.6 parts of a condensation product prepared by reacting glycerol and propylene glycol with adipic acid in a molar proportion of 1 to 2 to 2, said condensation product having an acid value of 8 mg. KOH per g.

C. A homogeneous solution was prepared following the procedure of Example 1 from 56 parts of Crystic 199, 39.9 parts of 4:4'-diphenyl methane diisocyanate and 47.5 parts of a condensation product prepared by reacting trimethylol propane and diethylene glycol with adipic acid in a molar proportion of 1 to 1.5 to 1.5, said condensation product having an acid value of 5.5 mg KOH per g. and a hydroxyl value of 345 mg. KOH per g. The solution contained 60% by weight of polyurethane precursors and 40% by weight of cured polyester resin precursors.

0.5 part of ditertiary butyl peroctoate was added to the solution which was then degassed and poured into a mould which had previously been heated to a temperature of 120° C. The mould was then heated in an oven at 120° C for 1 hour. The properties of the transparent sheet removed from the mould are given in Table 10.

D. By way of comparison and in order to show the properties of the product prepared from the polyurethane precursors alone, a homogeneous solution was prepared at 60° C from 48 parts of 4:4'-diphenylmethane diisocyanate and 62.1 parts of the condensation product described in C above. The solution was degassed, charged to a mould and heated following the procedure described in C above. The properties of the sheet removed from the mould are given in Table 10.

TABLE 10

| Experiment | Flexural Modulus Kg cm$^{-2}$ | Flexural Yield Strength Kg cm$^{-2}$ | Initial Modulus Kg cm$^{-2}$ | Impact Strength Kg cm cm$^{-2}$ | | Heat Distortion Temperature °C | |
|---|---|---|---|---|---|---|---|
| | | | | Notched | Unnotched | 66 lb/sq.in. | 264 lb/sq.in. |
| A | 34,000 | 1,410 | 34,500 | 4.4 | 50.6 | — | — |
| B | 29,500 | 1,145 | 28,000 | 4.8 | 102.3 | — | — |
| C | 31,000 | 1,285 | — | 3.4 | 56.2 | 73 | 66 |
| D | 27,500 | 1,005 | — | 5.0 | 120 | 61 | 55 | and a hydroxyl value of 387 mg. KOH per g. The solution contained 60% by weight of polyurethane precursors and 40% by weight of cured polyester resin precursors.

0.6 Part of each of Catalyst Paste B and Accelerator D and 0.1 part of dibutyl tin dilaurate were added to the solution which was then degassed, charged to a mould and allowed to stand for 30 minutes at room temperature. The mould was then heated in an oven at 130° C for 2 hours. The properties of the transparent sheet removed from the mould are given in Table 10.

B. By way of comparison and in order to show the properties of the product prepared from the polyurethane precursors alone, a homogeneous solution was prepared at 60° C from 32.4 parts of 4:4'-diphenyl methane diisocyanate and 37.6 parts of the condensation product described in A above. The solution was degassed, charged to a mould which was then allowed to stand at room temperature for 18 hours and was then heated in an oven at 130° C for 2 hours. The properties of the sheet removed from the mould are given in Table 10.

EXAMPLE 16

A. A homogeneous solution was prepared at 50° C following the procedure of Example 1 from 35.2 parts of 4:4'-diphenyl methane diisocyanate, 36.7 parts of oxypropylated glycerol having a molecular weight of 425 and 48 parts of Crystic 199. 0.5 part of di-tertiary butyl peroxide and 0.1 part of dibutyl tin dilaurate were then added to the solution.

The solution was allowed to cool to room temperature and was then degassed and charged to a mould following the procedure described in Example 1. The mould and contents were allowed to stand at room temperature for 4 hours and were then heated in an oven for 16 hours at a temperature of 140° C. The mould was removed from the oven and the moulded sheet removed. The properties of the transparent sheet are shown in Table 11.

B. In a comparative experiment the above procedure described in A was repeated except that the 4:4'-diphenyl methane diisocyanate was replaced by 36.1 parts of 4:4'-dicyclohexylmethane diisocyanate and 35.7 parts of oxyproplyated glycerol of molecular weight 425 were used. The properties of the moulded sheet are shown in Table 11.

TABLE 11

| Experiment | Flexural Modulus Kg cm$^{-2}$ | Flexural Yield Strength Kg cm$^{-2}$ | Impact Strength Kg cm cm$^{-2}$ | | Heat Distortion Temperature °C | |
|---|---|---|---|---|---|---|
| | | | Notched | Unnotched | 66 lb/sq.in. | 264 lb./sq.in. |
| A | 32,000 | 1,465 | 4.3 | 46.2 | 93 | 82 |
| B | 27,000 | 1,125 | 1.0 | 35.1 | 70 | — |
| C | 36,500 | 1,595 | 1.7 | 27.7 | 74 | 67 |
| D | 34,000 | 1,320 | 1.7 | 31.5 | 57 | 43 |
| E | 6,500 | 240 | 3.0 | 103.8 | 43 | 28 |

In a further comparative experiment the above procedure described in A was repeated except that the 4:4'-diphenyl methane diisocyanate was replaced by 28.7 parts of toluene diisocyanate and 42.4 parts of oxypropylated glycerol of molecular weight 425 were used. The properties of the moulded sheet are shown in Table 11.

D. In a further comparative experiment, the above procedure described in A was repeated except that the 4:4'-diphenyl methane diisocyanate was replaced by 30 parts of xylylene diisocyanate, and 42 parts of oxypropylated glycerol of molecular weight 425 and 0.4 part of dibutyl tin dilaurate were used. The properties of the moulded sheet are shown in Table 11.

E. In another comparative experiment, the above procedure described in A was repeated except that the 4:4'-diphenyl methane diisocyanate was replaced by 28.4 parts of hexamethylene diisocyanate, and 44.6 parts of oxypropylated glycerol of molecular weight 425, and 0.4 part of dibutyl tin dilaurate were used. The properties of the moulded sheet are shown in Table 11.

In each of the above Examples A to E, the homogeneous solutions contained 60% by weight of polyurethane precursors and 40% by weight of cured polyester resin precursors.

EXAMPLE 17

A. A homogeneous solution was prepared at 50° C following the procedure of Example 1 from 40.4 parts of 4:4'-diphenylmethane diisocyanate, 31.5 parts of oxypropylated glycerol of molecular weight 315, and 48 parts of Crystic 199. 0.5 part of tertiary butyl perbenzoate and 0.1 part of dibutyl tin dilaurate were added to the solution which was then degassed and charged to a mould as described in Example 1. The mould was allowed to stand at room temperature for 1½ hours and was then heated in an oven at 140° C for 16 hours. The properties of the transparent sheet removed from the moulded are given in Table 12.

B. In a comparative experiment, the above procedure described in A was repeated except that the 4:4'-diphenyl methane diisocyanate was replaced by 41.3 parts of 4:4'-dicyclohexylmethane diisocyanate and 30.7 parts of oxypropylated glycerol of molecular weight 315 were used. The properties of the sheet removed from the mould are given in Table 12.

C. In a further comparative experiment, the above procedure described in A was repeated except that the 4:4'-diphenyl methane diisocyanate was replaced by 33.7 parts of toluene diisocyanate and 38.3 parts of oxypropylated glycerol of molecular weight 315 were used. The properties of the transparent sheet removed from the mould are given in Table 12.

In each of the above Examples A to C, the homogeneous solutions contained 60% by weight of polyurethane precursors and 40% by weight of cured polyester resin precursors.

TABLE 12

| Experiment | Flexural Modulus Kg cm$^{-2}$ | Flexural Yield Strength Kg cm$^{-2}$ | Heat Distortion Temperature °C | |
|---|---|---|---|---|
| | | | 66 lb/sq.in. | 264 lb/sq.in. |
| A | 30,000 | 1,505 | 118 | 113 |
| B | 28,000 | 1,300 | 105 | 90 |
| C | 36,000 | Did not yield | 106 | 95 |

EXAMPLE 18

A. A homogeneous solution was prepared at 60° C following the procedure of Example 1 from 27.3 parts of 4:4'-diphenyl methane diisocyanate, 27.1 parts of oxypropylated glycerol of molecular weight 425 and 54 parts of Crystic 199. 0.5 Part of tertiary butyl perbenzoate and 0.1 part of dibutyl tin dilaurate were added to the solution which was then degassed and charged to a mould following the procedure of Example 1. The mould was allowed to stand at room temperature for 1½ hours and was then heated in an oven at 140° C for 16 hours. The properties of the transparent sheet removed from the mould are given in Table 13.

B. In a comparative experiment, the procedure described in A above was followed except that the 4:4'-diphenylmethane diisocyanate was replaced by 27.9 parts of 4:4'-dicyclohexylmethane diisocyanate, and 26.4 parts of oxypropylated glycerol of molecular weight 425 were used. The properties of the transparent sheet removed from the mould are given in Table 13.

C. In a further comparative experiment, the procedure described in A above was repeated except that the 4:4'-diphenylmethane diisocyanate diisocyanate was replaced by 21.9 parts of toluene diisocyanate and 32.0 parts of oxypropylated glycerol of molecular weight 425 were used. The properties of the transparent sheet removed from the mould are given in Table 13.

In each of the above Examples A to C, the homogeneous solutions contained 50% by weight of polyurethane precursors and 50% by weight of cured polyester resin precursors.

TABLE 13

| Experiment | Flexural Modulus Kg cm$^{-2}$ | Flexural Yield Strength Kg cm$^{-2}$ | Heat Distortion Temperature °C 264 lb/sq.in. |
|---|---|---|---|
| A | 35,000 | 1,525 | 92 |
| B | 26,500 | 1,200 | 67 |
| C | 38,500 | Did not yield | 64 |

EXAMPLE 19

In order to illustrate the further shaping of a partially gel-polymerised shaped article, a homogeneous solution was prepared following the procedure of Example 1 from 125 parts of 4:4′-diphenyl methane diisocyanate, 325 parts of Crystic 199 and 200 parts of oxypropylated glycerol of average molecular weight 625, the solution containing 50% by weight of polyurethane precursors and 50% by weight of cured polyester resin precursors. 16.5 Parts of di-teriaryl butyl peroxide and 0.9 part of dibutyl tin dilaurate were added to the solution and the solution was then degassed and charged to a mould formed by a 1 inch wide by ⅛ inch deep steel gasket placed on a 13 inch × 13 inch aluminium plate. The aluminium plate had previously been covered by a poly(ethylene terephthalate) film and the film and plate had previously been heated to a temperature of 100° C in an oven. The mould was closed by placing a poly(ethylene terephthalate) film and aluminium plate (previously heated to 100° C) over the mould and the mould was allowed to stand for 1 hour with a 10 Kg weight on the mould.

The resultant pliable partially gel-polymerised sheet was then removed from the mould and shaped by hand over a dome-shaped mould, the diameter of the base of the mould being 6 inches and the height of the dome at its apex being 2 inches. The partially gel-polymerised shaped article and the mould were then heated in an oven at 150° C for 5 minutes to produce a rigid shaped article.

In order to illustrate the further shaping of a partially gel-polymerised shaped article which contained glass fibre reinforcement the procedure of the further experiment described in Example 1 was repeated except that the degassed solution and the random chopped glass fibre matts were allowed to remain in the mould for 1 hour, a 10 Kg weight being placed on the mould. The mould was then opened and the pliable sheet removed therefrom was bent by hand through an angle of 90° to give an L-shaped sheet. The shape of the thus formed sheet was maintained by means of clamps and it was then heated in an oven at a temperature of 130° C for 2 hours in order to complete the curing.

EXAMPLE 20

A. A homogeneous solution was prepared following the procedure of Example 1 from 67 parts of 4:4′-diphenyl methane diisocyanate, 47 parts of oxypropylated trimethylol propane of molecular weight 310 and 110 parts of Crystic 199. 4.4 parts of ditertiary butyl peroxide and 0.1 part of dibutyl tin dilaurate were then added to the solution. The solution contained 51% by weight of polyurethane precursors and 49% by weight of cured polyester resin precursors.

Thereafter the procedure described in the further experiment of Example 1 was followed to prepare a glass fibre reinforced moulded sheet with the exception that the glass fibre matts were replaced by strands of glass fibre aligned substantially unidirectionally in the mould.

The properties of the moulded sheet are given in Table 14.

B. The procedure described in A above was followed except that the homogeneous solution was formed from 35 parts of 4:4′-diphenyl methane diisocyanate, 68 parts of oxypropylated glycerol of molecular weight 430 and 80 parts of Crystic 199, the solution containing 61% by weight of polyurethane precursors and 59% by weight of cured polyester resin precursors.

The properties of the moulded sheet are given in Table 14.

C. The procedure described in A above was followed except that the glass fibre reinforcement was replaced by a carbon fibre reinforcement (Morganite "Modnor" Type 1, untreated high modulus graphite fibre), the carbon fibres being aligned substantially unidirectionally in the mould.

The properties of the resultant carbon fibre reinforced moulded sheet are given in Table 14.

D. The procedure described in A above was followed except that the glass fibre reinforcement was replaced by poly(ethylene terephthalate) fibre reinforcement (2 denier normal tenacity fibre free of finish and heat set at a temperature of 140° C). The poly(ethylene terephthalate) fibres were aligned substantially unidirectionally in the mould. The properties of the resultant sheet are shown in Table 14.

TABLE 14

| Experiment | % by weight of fibre based on total weight of moulded sheet | In the direction of the fibre reinforcement | | At right angles to the fibre reinforcement | |
|---|---|---|---|---|---|
| | | Flexural Modulus Kg cm$^{-2}$ | Flexural Breaking Strength Kg cm$^{-2}$ | Flexural Modulus Kg cm$^{-2}$ | Flexural Breaking Strength Kg cm$^{-2}$ |
| A | 33 | 12.9 × 10$^4$ | 4,970 | 4.0 × 10$^4$ | 555 |
| B | 38 | 16.5 × 10$^4$ | 5,900 | 4.7 × 10$^4$ | 510 |
| C | 42 | 37 × 10$^4$ | 4,420 | 3.0 × 10$^4$ | 330 |
| D | 20 | 4.0 × 10$^4$ | 1,540 | 3.0 × 10$^4$ | 640 |

In each of the Examples A to D above, the flexural properties were determined on specimens cut from the moulded sheet, measurements being made both in the direction of the fibre reinforcement and in a direction at right angles to the fibre reinforcement.

EXAMPLE 21

A. A homogeneous solution was prepared following the procedure of Example 1 at 50° C from 144 parts of 4:4′-diphenyl methane diisocyanate, 108 parts of oxypropylated glycerol of molecular weight 315, and 168 parts of Crystic 199. The solution was allowed to cool to room temperature and 6.4 parts of Catalyst Paste H, 6.4 parts of Accelerator E and 0.1 part of dibutyl tin dilaurate were added. The solution contained 60% by weight of polyurethane precursors and 40% by weight of cured polyester resin precursors.

The solution was then degassed and charged to a mould following the procedure of Example 1 and the mould was allowed to stand at room temperature for 18 hours. Thereafter the mould was heated in an oven at 80° C for 5 hours and 130° C for 18 hours. The properties of the transparent sheet removed from the mould are given in Table 15.

B. In a further experiment, a homogeneous solution was prepared following the above procedure except that the solution was prepared at a temperature of 80° C, the solution was not allowed to cool to room temperature, and 1.6 parts of tertiary butyl perbenzoate were used in place of the Catalyst Paste H, Accelerator E and dibutyl tin dilaurate.

TABLE 15

| Experiment | Flexural Modulus Kg cm$^{-2}$ | Flexural Yield Strength Kg cm$^{-2}$ | Impact Strength Kg cm cm$^{-2}$ | | Falling weight Impact Strength ft.lb. | Heat Distortion Temperature °C | |
|---|---|---|---|---|---|---|---|
| | | | Notched | Unnotched | | 66 lb/sq.in. | 264 lb/sq.in. |
| A | *33,300 | *1,390 | 2.9 | 44.5 | 1.6 | 96 | 90 |
| B | **31,500 | **1,525 | 6.0 | 45.0 | 3.6 to 4.2 | 120 | 114 |
| C | **2,500 | **120 | 9.9 | 7135 | 12 to 15 | 62 | — |

*measured at a strain rate of 1% per minute
**measured at a strain rate of 10% per minute Table 16

| Experiment | Flexural Modulus Kg cm$^{-2}$ | Flexural Yield Strength Kg cm$^{-2}$ | Impact Strength Kg cm cm$^{-2}$ | | Falling weight Impact Strength ft.lb. | Heat Distortion Temperature °C | |
|---|---|---|---|---|---|---|---|
| | | | Notched | Unnotched | | 66 lb/sq.in. | 264 lb/sq.in. |
| A | 34,000 | 1,355 | 6.4 | 70.6 | 3.0 | 84 | 75 |
| B | 33,000 | 1,330 | 6.7 | 93.6 | 3.6 to 4.2 | 95 | 85 |

Immediately after addition of the tertiary butyl perbenzoate, the solution, while still at a temperature of 80° C, was degassed and charged to a mould as used in Example 1 which had previously been heated to a temperature of 100° C. The mould was placed immediately in an oven at a temperature of 130° C and allowed to remain for 1 hour. The properties of the transparent sheet removed from the mould are given in Table 15.

C. By way of comparison a homogeneous solution was prepared at 50° C from 14.5 parts of 4:4'-diphenyl methane diisocyanate, 63.7 parts of a condensate having a combined acid and hydroxyl value of 80 mg. KOH per g. and prepared by reacting pentaerythritol, diethylene glycol and adipic acid in a molar proportion of 1 to 30 to 25, and 52 parts of Crystic 199. (The polyurethane precursors, that is 4:4'-diphenyl methane diisocyanate and the aforementioned condensate were capable of forming a cross-linked polyurethane having a glass-rubber transition temperature of −25° C). 0.5 Part of tertiary butyl peroctoate was added to the solution and, with the solution still at a temperature of 50° C, the solution was degassed and poured into a mould be used in Example 1 which has previously been heated to a temperature of 90° C.

The mould was the placed immediately in an oven and heated at a temperature of 140° C for 2 hours.

The sheet removed from the mould was opaque and had the properties shown in Table 15.

EXAMPLE 22

A. A homogeneous solution was prepared following the procedure of Example 1 at 50° C from 117 parts of 4:4'-diphenyl methane diisocyanate, 123 parts of oxypropylated glycerol of molecular weight 425, and 160 parts of Crystic 199. The solution was cooled to room temperature and 3.2 parts of Catalyst Paste B, 3.2 parts of Accelerator D and 0.2 part of dibutyl tin dilaurate were added. The solution contained 60% by weight of polyurethane precursors and 40% by weight of cured polyester resin precursors.

The solution was then degassed and charged to a mould following the procedure of Example 1 and the mould was allowed to stand at room temperature for 1 hour and was then heated in an oven at 130° C for 2 hours. The properties of the transparent sheet removed from the mould are given in Table 16.

B. In a further experiment a homogeneous solution was prepared following the above procedure except that the solution was not allowed to cool before addition of the catalysts and the Catalyst Paste B, Accelerator D and dibutyl tin dilaurate were replaced by 1.6 parts of tertiary butyl peroctoate.

Immediately after addition of the tertiary butyl peroctoate the solution, while still at a temperature of 50° C was degassed and charged to a mould as used in Example 1 which had previously been heated to a temperature of 110° C. The mould was placed immediately in an oven at a temperature of 110° C and allowed to remain for 1 hour. The properties of the transparent sheet removed from the mould are given in Table 16.

EXAMPLE 23

A homogeneous solution was prepared at 60° C from 9.8 parts of 4:4'-diphenyl-ether diisocyanate, 10.1 part of oxypropylated glycerol of molecular weight 425, and 13.2 parts of Crystic 199. 0.2 parts of tertiary butyl perbenzoate and 0.03 part of dibutyl tin dilaurate were added to the resultant clear solution, and the solution was degassed and charged to a mould at room temperature. The mould was as used in Example 1.

The mould and contents were allowed to stand at room temperature for 18 hours and were then heated in an oven for 2 hours at 140° C.

The transparent sheet removed from the mould had the following properties:

| | |
|---|---|
| Flexural modulus | 34,000 kg.cm$^{-2}$ |
| Flexural breaking strength | 1270 kg.cm$^{-2}$ |
| Notched impact strength | 3.0 kg.cm cm$^{-2}$ |
| Heat distortion temperature (ASTM D648/56 66 lb/sq.in) | 79° C |

What is claimed is:

1. A tractable shaped article capable of being further shaped and cured into an intractable shaped article, said tractable shaped article consisting essentially of a homogeneously prepared mixture which has been polymerized to a degree that a tractable partially polymerized article is obtained, said homogeneously prepared mixture consisting essentially of:
   a. from 5% to 95% by weight of polyurethane precursors free of ethylenic unsaturation comprising
      1. at least one polyol or hydroxy-terminated polyester containing hydroxy groups reactive with isocyanate groups wherein the hydroxy groups of said polyol or polyester polyurethane precursors are the only polyurethane precursor substituents reactive with isocyanate groups, and 1. at least one polyisocyanate of the structure

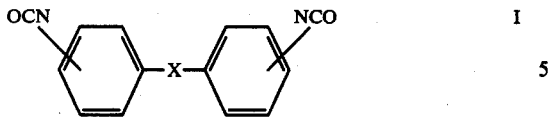

wherein X is a divalent radical containing at most three atoms in the chain between the phenyl groups in said structure, or a mixture comprising at least 40% by weight of the total polyisocyanate of at least one other polyisocyanate, said polyurethane precursors being capable of forming if cured alone in the absence of precursors of cured polyester resin a cross-linked polyurethane having a glass-rubber transition temperature of at least 25° C, as measured with a DuPont 900 thermal analyzer, the rate of heating the sample being 20° C per minute, at least one of said polyol, hydroxy-terminated polyester or other polyisocyanate being tri-functional or of higher functionality; and b. from 95% to 5% by weight of precursors of cured polyester resin consisting essentially of
3. at least one ethylenically unsaturated polyester containing in each molecule at least two hydroxy or carboxylic acid groups reactive with isocyanate groups, and
4. at least one vinyl monomer containing at least one ethylenically unsaturated group which will react with ethylenically unsaturated groups in the polyester, said precursors of cured polyester resin comprising from 40–90% by weight of (3) and from 60–10% by weight of (4) and said vinyl monomer being selected from the group consisting of styrene, methyl methacrylate, divinyl benzene, diallyl phthalate and vinyl toluene.

2. A process for preparing a tractable shaped article of simple profile capable of being further shaped and cured into an intractable shaped article, said process comprising the steps of:

A. preparing a homogeneous mixture consisting essentially of
a. from 5% to 95% by weight of polyurethane precursors free of ethylenic unsaturation comprising
1. at least one polyol or hydroxy-terminated polyester containing hydroxy groups reactive with isocyanate groups wherein the hydroxy groups of said polyol or polyester polyurethane precursors are the only polyurethane precursor substituents reactive with isocyanate groups, and
2. at least one polyisocyanate of the structure

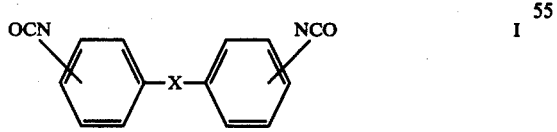

wherein X is a divalent radical containing at most three atoms in the chain between the phenyl groups in said structure, or a mixture comprising at least 40% by weight of the total polyisocyanate of at least one polyisocyanate having the structure I with at least one other polyisocyanate, said polyurethane precursors being capable of forming if cured alone in the absence of precursors of cured polyester resin a cross-linked polyurethane having a glass-rubber transition temperature of at least 25° C, as measured with a DuPont 900 thermal analyzer, the rate of heating the sample being 20° C per minute, at least one of said polyol, hydroxy-terminated polyester or other polyisocyanate being tri-functional or of higher functionality; and b. from 95% to 5% by weight of precursors of cured polyester resin consisting essentially of
3. at least one ethylenically unsaturated polyester containing in each molecule at least two hydroxy or carboxylic acid groups reactive with isocyanate groups, and
4. at least one vinyl monomer containing at least one ethylenically unsaturated group which will react with ethylenically unsaturated groups in the polyester, said precursors of cured polyester resins comprising from 40–90% by weight of (3) and from 60–10% by weight of (4) and said vinyl monomer being selected from the group consisting of styrene, methyl methacrylate, divinyl benzene, diallyl phthalate and vinyl toluene;

B. polymerizing said mixture in a mould to a degree such that a tractable partially polymerized article is obtained.

3. A process for preparing a tractable shaped article capable of being further shaped and cured into an intractable shaped article, said process comprising the steps of:

A. preparing a homogeneous mixture consisting essentially of
a. from 5% to 95% by weight of polyurethane precursors free of ethylenic unsaturation comprising
1. at least one polyol or hydroxy-terminated polyester containing hydroxy groups reactive with isocyanate groups wherein the hydroxy groups of said polyol or polyester polyurethane precursors are the only polyurethane precursor substituents reactive with isocyanate groups, and
2. at least one polyisocyanate compound of the structure

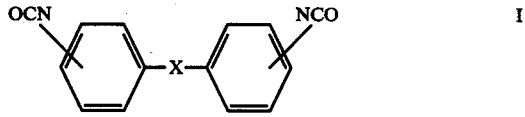

wherein X is a divalent radical containing at most three atoms in the chain between the phenyl groups in said structure, or a mixture comprising at least 40% by weight of the total polyisocyanate of at least one polyisocyanate having the structure I with at least one other polyisocyanate, said polyurethane precursors being capable of forming if cured alone in the absence of precursors of cured polyester resin a cross-linked polyurethane having a glass-rubber transition temperature of at least 25° C, as measured with a DuPont 900 thermal analyzer, the rate of heating the sample being 20° C per minute, at least one of said polyol, hydroxy-terminated polyester or other polyisocyanate being tri-functional or of higher functionality; and b. from 95% to 5% by weight of precursors of cured polyester resin consisting essentially of
3. at least one ethylenically unsaturated polyester containing in each molecule at least two hydroxy or carboxylic acid groups reactive with isocyanate groups, and
4. at least one vinyl monomer containing at least one ethylenically unsaturated group which will react with ethylenically unsaturated groups in the polyester, said precursors of cured polyester comprising from 40–90% by weight of (3) and from 60–10% by weight of (4) and said vinyl monomer being selected from the group consisting of styrene, methyl methacrylate, divinyl benzene, diallyl phthalate and vinyl toluene;

B. shaping said mixture and reacting said polyurethane precursors without substantial reaction between said polyester and vinyl monomer to obtain said shaped tractable article.

4. A tractable shaped article as claimed in claim 1 in which the polyurethane precursors are capable of forming a cross-linked polyurethane having a glass-rubber transition temperature of at least 35° C.

5. A tractable shaped article as claimed in claim 1 which is a gel-polymerisate of from 40 to 60% by weight of polyurethane precursors and from 60 to 40% by weight of cured polyester resin precursors.

6. A tractable shaped article as claimed in claim 1 which is a gel-polymerisate of 50% by weight or greater of polyurethane precursors and 50% by weight or less of precursors cured polyester resin.

7. A tractable shaped article as claimed in claim 1 which is a gel-polymerisate of from 50 to 80% by weight of polyurethane precursors and from 50 to 20% by weight of cured polyester resin precursors.

8. A tractable shaped article as claimed in claim 1 in which the molar proportion of groups reactive with isocyanate groups in the polyfunctional compound plus ethylenically unsaturated polyester, to isocyanate groups in the polyisocyanate is in the range 0.8:1 to 1.1:1.

9. A tractable shaped article as claimed in claim 8 in which the molar proportion is in the range 0.9:1 to 1:1.

10. A tractable shaped article as claimed in claim 1 in which the precursors of cured polyester resin comprise from 50 to 70% by weight of at least one ethylenically unsaturated polyester and from 50 to 30% by weight of at least one vinyl monomer.

11. A tractable shaped article as claimed in claim 1 in which the polyisocyanate is a compound having the structure

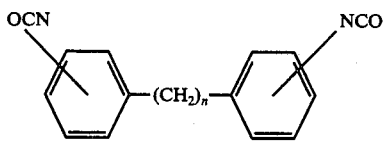

where $n$ is a whole number in the range 1 to 3.

12. A tractable shaped article as claimed in claim 11 in which the polyisocyanate is 4:4'-diphenylmethane diisocyanate.

13. A tractable shaped article as claimed in claim 12 in which the polyisocyanate is 4:4'-diphenylmethane diisocyanate in admixture with other polyisocyanates.

14. A tractable shaped article as claimed in claim 1 in which the polyisocyanate is 4:4'-diphenylether diisocyanate.

15. A tractable shaped article as claimed in claim 1 in which the component (a) (1) is a polyol.

16. A tractable shaped article as claimed in claim 15 in which the polyol is selected from the group consisting of oxypropylated trimethylol propane and oxypropylated glycerol.

17. A tractable shaped article as claimed in claim 1 in which the component (a) (1) is a polyester.

18. A tractable shaped article as claimed in claim 17 in which the polyester is selected from the group consisting of a condensate of adipic acid with glycerol and either ethylene glycol or propylene glycol, and a condensate of adipic acid with trimethylol propane and either diethylene glycol or propylene glycol.

19. A tractable shaped article as claimed in claim 1 in which the ethylenically unsaturated polyester is selected from the group consisting of a condensate of isophthalic acid and fumaric acid with propylene glycol, a condensate of phthalic acid or anhydride and fumaric acid with propylene glycol, cyclohexane-1:4-diol or neopentyl glycol, and a condensate of propylene glycol with either fumaric acid or a mixture of phthalic acid or anhydride and maleic acid or anhydride.

20. A tractable shaped article as claimed in claim 1 which contains fibre reinforcement.

21. A tractable shaped article as claimed in claim 20 in which the fibre reinforcement is present in a proportion of 5% to 50% by weight of the total weight of the fibre reinforced shaped article.

22. A tractable shaped article as claimed in claim 21 in which the fibre reinforcement is present in a proportion of 20% to 50% by weight of the total weight of the fibre reinforced shaped article.

23. A tractable shaped article as claimed in claim 20 in which the reinforcement is selected from the group consisting of glass fibre, carbon fibre and poly(ethylene terephthalate) fibre.

24. A process as claimed in claim 2 in which the component (a) (1) in the polyurethane precursors has a molecular weight of 1000 or less.

25. A process as claimed in claim 24 in which the component (a) (1) has a molecular weight of 650 or less.

26. A process as claimed in claim 2 in which substantially the whole of the polymerisation is effected at a temperature which is above the heat distortion temperature as measured by the test method described in ASTM D648/56 (66 lbs/sq.in) of the resultant gel-polymerisate.

27. A process as claimed in claim 2 in which the mixture is shaped by casting the mixture into a mould or by compression moulding.

28. A process for the production of a polymeric article of complex profile which comprises the steps of
a. performing a further shaping operation on a tractable shaped article of simple profile formed by partially gel-polymerising a homogeneous mixture of polyurethane precursors and cured polyester resin precursors as described in claim 1, and
b. causing or allowing the thus further shaped article to retain its shape while completing the gel-polymerisation.

29. A process for the production of an intractable polymeric article of complex profile which comprises the steps of
   a. performing a further shaping operation on a tractable shaped article as produced according to claim 2, and
   b. causing or allowing the thus further shaped article to retain its shape while substantially fully reacting the vinyl monomer to form an intractable shaped article.

30. The process of claim 29 comprising raising the temperature of said further shaped article sufficient to activate the reaction of said polyester and vinyl monomer.

31. An intractable shaped article of complex profile which comprises the shaped article of claim 1 which has been further shaped and cured to form an intractable shaped article.

32. A tractable shaped article, as claimed in claim 1, wherein precursors of the cross-linked polyurethane are substantially fully reacted before any substantial reaction has taken place between the polyester and vinyl monomer.

33. A tractable shaped article, as claimed in claim 13, wherein said other polyisocyanates have a total functionality greater than 2.

34. A tractable shaped article, as claimed in claim 33, wherein said mixture of diisocyanate and other polyisocyanates have a total isocyanate functionality of approximately 2.7.

* * * * *

UNITED STATES PATENT OFFICE
CERTIFICATE OF CORRECTION

Patent No. 4,062,826        Dated  December 13, 1977

Inventor(s) Francis Gowland Hutchinson,
  Richard George Cleveland Henbest, and Margaret Kenley Leggett It is certified that error appears in the above-identified patent and that said Letters Patent are hereby corrected as shown below:

At Section [63] under the heading "Related U.S. Application Data", line 1 should be corrected to read:

--Continuation of Ser. No. 230,092, Feb. 28, 1972,--

Claim 1 at the top of column 29, subparagraph heading "1" should be corrected to read:

--2--.

Signed and Sealed this

Thirtieth Day of May 1978

[SEAL]

Attest:

RUTH C. MASON
Attesting Officer

LUTRELLE F. PARKER
Acting Commissioner of Patents and Trademarks